(12) United States Patent
Mizufuka et al.

(10) Patent No.: US 11,804,052 B2
(45) Date of Patent: Oct. 31, 2023

(54) METHOD FOR SETTING TARGET FLIGHT PATH OF AIRCRAFT, TARGET FLIGHT PATH SETTING SYSTEM, AND PROGRAM FOR SETTING TARGET FLIGHT PATH

(71) Applicant: SEIKO EPSON CORPORATION, Tokyo (JP)

(72) Inventors: Eric Mizufuka, Redondo Beach, CA (US); Michael Leyva, Marina Del Rey, CA (US); Takunori Iki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 282 days.

(21) Appl. No.: 16/830,459

(22) Filed: Mar. 26, 2020

(65) Prior Publication Data
US 2021/0304624 A1   Sep. 30, 2021

(51) Int. Cl.
*G06V 20/64* (2022.01)
*G08G 5/00* (2006.01)
(Continued)

(52) U.S. Cl.
CPC ............ *G06V 20/64* (2022.01); *B64C 39/024* (2013.01); *G02B 27/0172* (2013.01);
(Continued)

(58) Field of Classification Search
CPC .................................................. G08G 5/0034
See application file for complete search history.

(56) References Cited

U.S. PATENT DOCUMENTS 9,660,718 B2 *  5/2017 Jalali ..................... H04W 16/28
10,203,762 B2 *  2/2019 Bradski ................ H04N 21/414
(Continued)

FOREIGN PATENT DOCUMENTS

| EP | 2978258 A1 * | 1/2016 | ........... B64C 39/024 |
| EP | 3251108 A1 * | 12/2017 | ........... B64C 39/024 |

(Continued)

OTHER PUBLICATIONS

NPL, Massimiliano Iacono, Path following and obstacle avoidance for an autonomous UAV using a depth camera, (https://doi.org/10.1016/j.robot.2018.04.005)(Aug. 2018) (hereinafter "Iacono").*

*Primary Examiner* — Jean Paul Cass
(74) *Attorney, Agent, or Firm* — Global IP Counselors, LLP

(57) ABSTRACT

A method for setting a target flight path of an aircraft in a physical environment, the method includes: displaying a virtual three-dimensional model corresponding to the physical environment; setting a start point in the virtual three-dimensional model according to a user input indicative of a position of the start point; continuously tracking a trajectory of a physical object moved in a space corresponding to the virtual three-dimensional model while displaying within the virtual three-dimensional model a continuous path corresponding to the trajectory of the physical object from the start point; setting an end point of the continuous path in the virtual three-dimensional model according to a user input indicative of a position of the end point; and generating the target flight path of the aircraft in the physical environment based on the continuous path from the start point to the end point in the virtual three-dimensional model.

15 Claims, 11 Drawing Sheets

(51) Int. Cl.
    *B64C 39/02*       (2023.01)
    *G02B 27/01*      (2006.01)
    *G06V 40/10*      (2022.01)
    *G06V 20/13*      (2022.01)
    *G06V 20/17*      (2022.01)
    *G06V 20/20*      (2022.01)
    *B64U 101/00*     (2023.01)

(52) U.S. Cl.
    CPC .............. *G06V 20/13* (2022.01); *G06V 20/17* (2022.01); *G06V 20/20* (2022.01); *G06V 40/107* (2022.01); *G08G 5/006* (2013.01); *G08G 5/0034* (2013.01); *G08G 5/0039* (2013.01); *G08G 5/0069* (2013.01); *B64U 2101/00* (2023.01); *B64U 2201/20* (2023.01)

(56) References Cited

U.S. PATENT DOCUMENTS

| | | | |
|---|---|---|---|
| 10,511,091 B2 * | 12/2019 | Teague | H01Q 3/08 |
| 10,642,272 B1 * | 5/2020 | Parodi | G05D 1/101 |
| 2017/0039764 A1 | 2/2017 | Hu et al. | |
| 2017/0208512 A1 * | 7/2017 | Aydin | B64C 39/024 |
| 2018/0196425 A1 | 7/2018 | Kobayashi | |
| 2019/0220040 A1 * | 7/2019 | Wu | G05D 1/0044 |
| 2019/0315486 A1 * | 10/2019 | Martin | B64D 47/06 |
| 2020/0346750 A1 * | 11/2020 | Hu | G05D 1/106 |

FOREIGN PATENT DOCUMENTS

| | | | |
|---|---|---|---|
| WO | 2018/094670 A1 | 5/2018 | |
| WO | WO 2019 077682 | * | 4/2019 |

\* cited by examiner

METHOD FOR SETTING TARGET FLIGHT PATH OF AIRCRAFT, TARGET FLIGHT PATH SETTING SYSTEM, AND PROGRAM FOR SETTING TARGET FLIGHT PATH

BACKGROUND

Field of the Invention

The present invention relates to a method for setting a target flight path of an aircraft in a physical environment, a target flight path setting system, and a computer program for setting a target flight path of an aircraft in a physical environment.

Background Information

In recent years, unmanned aircrafts (unmanned aerial vehicles), such as drones, capable of being remotely piloted or autonomously flying have been developed. Applications include, but not limited to, mining (photogrammetry to measure volumetric displacement of dirt), agriculture (monitoring crop health/fields), search and rescue (grid based flight paths). These unmanned aircrafts are often equipped with on-board devices such as cameras for capturing aerial images/videos, sensors for obtaining topography data and other detection data, equipment for spraying agricultural agents on crops, etc. A controller having multiple levers has been traditionally used to remotely send various flight commands to the unmanned aircraft. However, remotely controlling the unmanned aircraft requires a considerable amount of skill as it requires a pilot or user to send precise commands at precise timings during flight to navigate the aircraft on the desired flight path. Moreover, in addition to controlling the aircraft's flight path, the pilot may also need to control properties of the on-board cameras or sensors during the flight to capture a desired flight image footage and/or data. For example, an orientation of a gimbal of the on-board camera is required to be precisely controlled during the flight in order to orient the on-board camera at a desired object to be captured, in addition to adjusting other camera parameters such as lens focal length.

U.S. Patent Application Publication No. 2018/0196425 proposes to use a head-mounted display (HMD) device to improve operability of the unmanned aircraft. More specifically, the HMD device is used to display an operation support information (e.g., an aircraft moving direction, an aircraft state information, a marker, and a map information) superimposed on the outside scene as the virtual image so that the user can perform the operation of the unmanned aircraft while referring to the support image without taking the eyes off and losing sight of the actual aircraft during the flight.

International Patent Publication No. WO 2018/094670 discloses a control method for an agricultural unmanned aerial vehicle, in which a flight path is set pre-flight using a two-dimensional map displayed on a ground control terminal. The flight path includes work parameter information such as a spray flow rate, a spray direction, flight speed, flight height, etc. for which numerical values at desired locations on the flight path are directly input via the user interface.

SUMMARY

However, in the conventional technology as described above, there is a problem that the method needs tangled process at each desired point by numeral input by the user. Moreover, it is difficult to set a complicated three-dimensional flight path, such as snaking, going over, or flying under existing physical structures. It is also quite challenging to configure the positions and orientations of the on-board devices such as cameras and sensors position in the three-dimensional space.

In view of the above, one object of the present disclosure is to provide a method for setting a target flight path of an aircraft in a physical environment, a target flight path setting system, and a computer program for setting a target flight path of an aircraft in a physical environment which enables a user to intuitively set a target flight path in a three-dimensional model of the physical environment in which the aircraft is to be operated.

One aspect of the present disclosure includes a method for setting a target flight path of an aircraft in a physical environment. The method includes: displaying a virtual three-dimensional model corresponding to the physical environment; setting a start point in the virtual three-dimensional model according to a user input indicative of a position of the start point; continuously tracking a trajectory of a physical object moved in a space corresponding to the virtual three-dimensional model while displaying within the virtual three-dimensional model a continuous path corresponding to the trajectory of the physical object from the start point; setting an end point of the continuous path in the virtual three-dimensional model according to a user input indicative of a position of the end point; and generating the target flight path of the aircraft in the physical environment based on the continuous path from the start point to the end point in the virtual three-dimensional model.

Another aspect of the present disclosure includes a target flight path setting system adapted to set a target flight path of an aircraft in a physical environment. The target flight path setting system includes a display device, an image sensor, a memory and a processor. The display device is configured to display a virtual three-dimensional model corresponding to the physical environment. The image sensor is configured to capture a movement of a physical object in a space corresponding to the virtual three-dimensional model. The memory configured to store the movement of the physical object output by the image sensor. The processor is configured to set a start point within the virtual three-dimensional model according to a user input indicative of a position of the start point, continuously track a trajectory of the movement of the physical object captured by the image sensor while controlling the display section to display within the virtual three-dimensional model a continuous path corresponding to the trajectory of the movement of the physical object from the start point, set an end point of the continuous path within the virtual three-dimensional model according to a user input indicative of a position of the end point, and generate the target flight path of the aircraft in the physical environment based on the continuous path from the start point to the end point in the virtual three-dimensional model.

Another aspect of the present disclosure includes a non-transitory machine readable medium including instructions for setting target flight path of an aircraft in a physical environment to, when executed by one or more processors, cause the one or more processors to perform operations including: displaying a virtual three-dimensional model corresponding to the physical environment; setting a start point in the virtual three-dimensional model according to a user input indicative of a position of the start point; continuously tracking a trajectory of a physical object moved in a space corresponding to the virtual three-dimensional model while displaying within the virtual three-dimensional model a continuous path corresponding to the trajectory of the physical object from the start point; setting an end point of the continuous path in the virtual three-dimensional model according to a user input indicative of a position of the end point; and generating the target flight path of the aircraft in the physical environment based on the continuous path from the start point to the end point in the virtual three-dimensional model.

BRIEF DESCRIPTION OF THE DRAWINGS

Referring now to the attached drawings which form a part of this original disclosure.

DETAILED DESCRIPTION OF EMBODIMENTS

Figure 1:
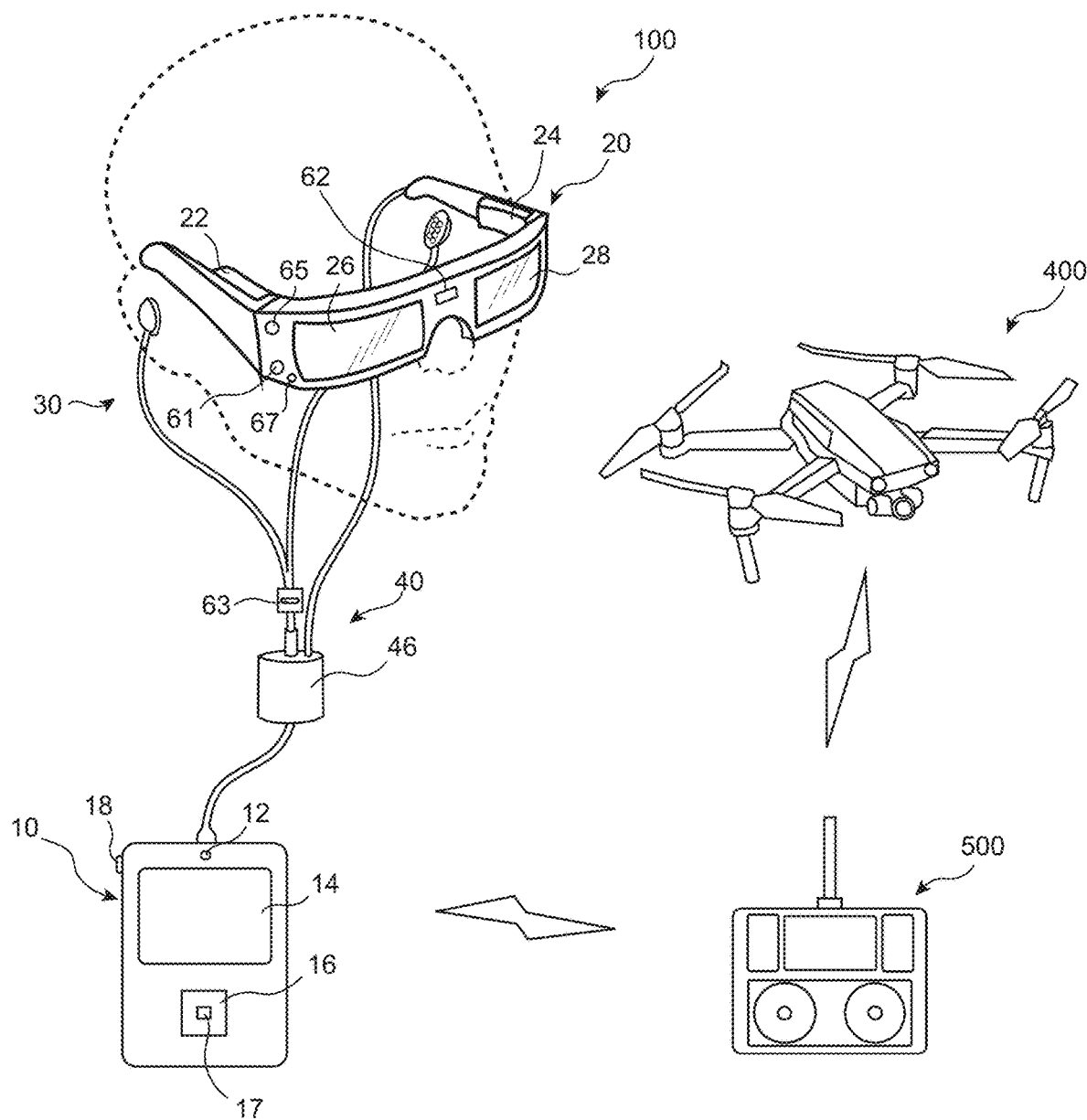
FIG. 1 is a schematic diagram illustrating a target flight path setting system according to one embodiment of the present invention.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. Referring initially to FIG. 1, a target flight path setting system is illustrated in accordance with an embodiment. FIG. 1 is an explanatory diagram showing a schematic configuration of a head-mounted display device 100. The head-mounted display device 100 is one example of the target flight path setting system. The head-mounted display device 100 is operatively connectable to an unmanned aircraft 400, and a remote control device 500.

The head-mounted display device 100 is a display device mounted on the head of the user and is also referred as a head-mounted display (HMD). In this example, the HMD 100 is a see-through type (a transmission type) display device that causes an image to emerge in an outside world visually recognized through glass.

Figure 2:
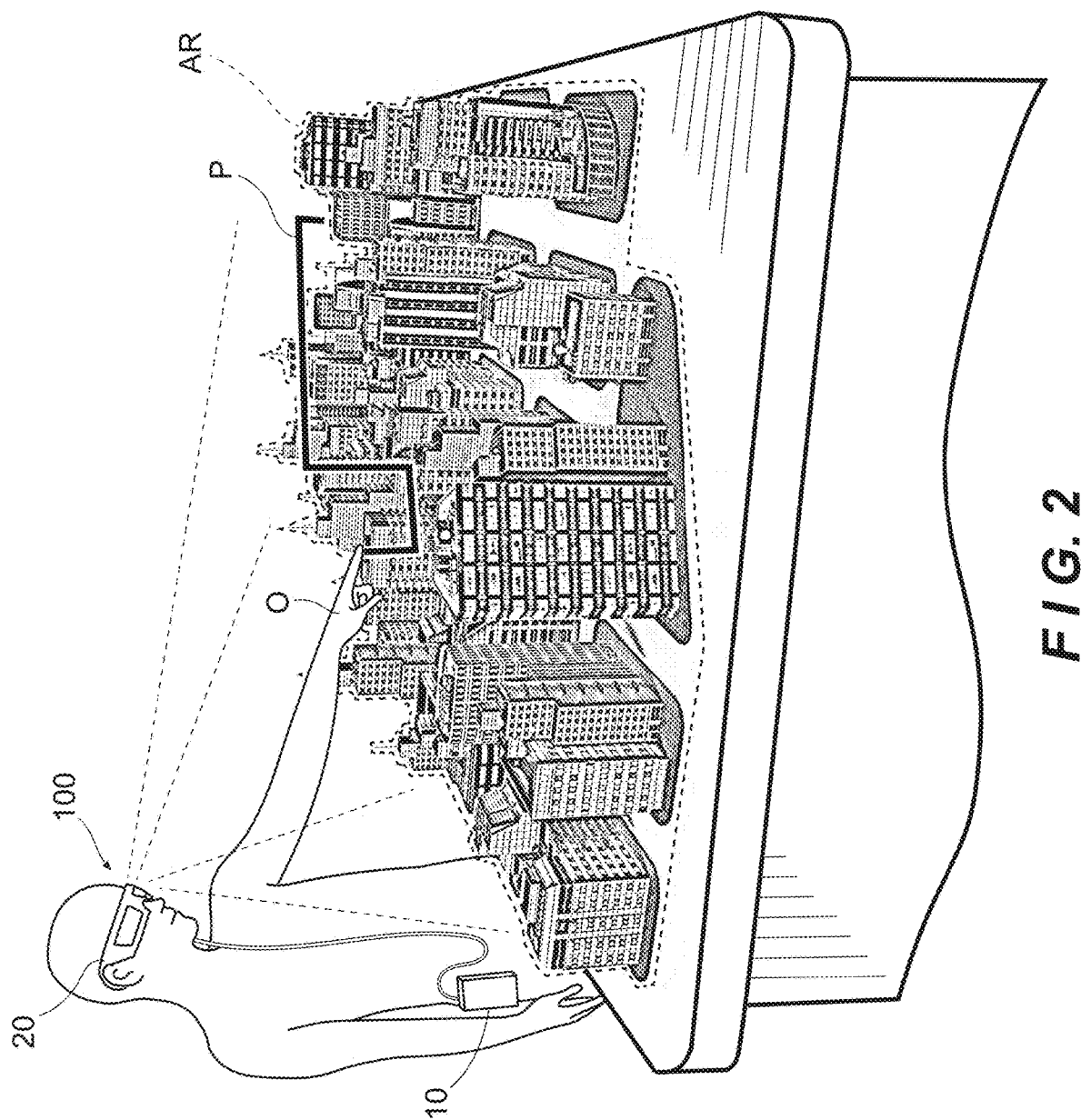
FIG. 2 is a schematic diagram illustrating one example of when a user sets the target flight path of an aircraft using a virtual three-dimensional model according to the embodiment.

The HMD 100 serves as a user interface system through which a user sets a target flight path of the unmanned aircraft 400 in a physical environment in which the unmanned aircraft 400 is to be operated. As shown in FIG. 2, the HMD 100 is configured to display a virtual three-dimensional model AR corresponding to the physical environment so that a user can set the target flight path using the virtual three-dimensional model AR.

As explained below, the HMD 100 is configured to allow the user to set a target flight path which may include, in addition to a flight path or route information, various attributes of the unmanned aircraft 400 such as control parameters for operating the on-board devices such as cameras, sensors, etc. In this example, as shown in FIG. 2, the head-mounted display device 100 is configured to navigate and set a target flight path within a three-dimensional virtual model of a physical environment where the unmanned aircraft 400 is to be operated. Although the head-mounted display device 100 is used as an example of a user interface system for setting a target flight path of the unmanned aircraft 400, the user interface system may include any conventional virtual reality device, augmented reality device, headset, mobile device, tablet computer, laptop computer, desktop computer, spatial tracking system, controller, and any other computer or device that can be utilized to interact within a virtual three-dimensional model AR to set a target flight path of the unmanned aircraft 400.

Once the target flight path is set using the HMD 100, specifications of the target flight path are preferably output from the HMD 100 to the unmanned aircraft 400. The unmanned aircraft 400 is configured to execute the flight according to the target flight path received. The HMD 100 may also be configured to support the operations of the unmanned aircraft 400 during the flight.

The HMD 100 includes an image display section 20 (one example of a display device) that causes the user to visually recognize an image, and a control device 10 that controls the image display section 20. The image display section 20 is a wearing body worn on the head of the user. In this embodiment, the image display section 20 has an eyeglass shape.

The image display section 20 includes a right display unit 22 and a left display unit 24, a right light guide plate 26, and a left light guide plate 28.

The right display unit 22 performs display of an image by the right light guide plate 26. The right display unit 22 is located in the vicinity of the right temporal region of the user in the worn state of the image display section 20. The left display unit 24 performs display of an image by the left light guide plate 28. The left display unit 24 is located in the vicinity of the left temporal region of the user in the worn state of the image display section 20. Note that the right display unit 22 and the left display unit 24 are collectively referred to as "display driving section" as well.

The right light guide plate 26 and the left light guide plate 28 in this embodiment are optical sections (e.g., prisms) formed of light transmissive resin or the like. The right light guide plate 26 and the left light guide plate 28 guide image lights output by the right display unit 22 and the left display unit 24 to the eyes of the user. Note that a dimming plate may be provided on the surfaces of the right light guide plate 26 and the left light guide plate 28. The dimming plate is a thin plate-like optical element having different transmittance depending on a wavelength region of light. The dimming plate functions as a so-called wavelength filter. For example, the dimming plate is disposed to cover a surface (a surface on the opposite side of a surface opposed to the eyes of the user) of the front frame. By selecting an optical characteristic of the dimming plate as appropriate, it is possible to adjust the transmittances of lights in any wavelength regions such as visible light, infrared light, and ultraviolet light. It is possible to adjust a light amount of external light made incident on the right light guide plate 26 and the left light guide plate 28 from the outside and transmitted through the right light guide plate 26 and the left light guide plate 28.

The image display section 20 guides image lights respectively generated by the right display unit 22 and the left display unit 24 to the right light guide plate 26 and the left light guide plate 28 and causes the user to visually recognize an image (an augmented reality (AR) image) such as the virtual three-dimensional model AR shown in FIG. 2 with the image lights (this is referred to as "display an image" as well). When the external light is transmitted through the right light guide plate 26 and the left light guide plate 28 and made incident on the eyes of the user from the front of the user, the image lights forming the image and the external light are superimposed and made incident on the eyes of the user. Therefore, visibility of the image in the user is affected by the intensity of the external light.

Therefore, it is possible to adjust easiness of the visual recognition of the image by, for example, attaching the dimming plate to the front frame and selecting or adjusting the optical characteristic of the dimming plate as appropriate. In a typical example, it is possible to select a dimming plate having light transmittance of a degree for enabling the user wearing the HMD 100 to visually recognize at least a scene on the outside. It is possible to suppress the sunlight and improve the visibility of the image. When the dimming plate is used, it is possible to expect an effect of protecting the right light guide plate 26 and the left light guide plate 28 and suppressing damage, adhesion of soil, and the like to the right light guide plate 26 and the left light guide plate 28. The dimming plate may be detachably attachable to the front frame or each of the right light guide plate 26 and the left light guide plate 28. A plurality of kinds of dimming plates may be able to be alternately attached. The dimming plates may be omitted.

A camera 61 is disposed in the front frame of the image display section 20. The camera 61 is provided in a position where the camera 61 does not block external light transmitted through the right light guide plate 26 and the left light guide plate 28 on the front surface of the front frame.

The camera 61 is a digital camera including an imaging device such as a CCD or a CMOS and an imaging lens. The camera 61 in this embodiment is a monocular camera. However, a stereo camera may be adopted. For example, a stereo camera including two or more lenses with a separate image sensor for each lens may be employed. Alternatively, two separate cameras may be respectively arranged on the left side and the right side of the image display section 20 so that images corresponding to the right eye and the left eye can be captured independently, and each image can be processed to achieve the augmented reality display. The camera 61 images at least a part of an outside scene (a real-world view) in a front side direction of the HMD 100, which is an image of a visual field visually recognized by the user in the worn state of the image display section 20. In other words, the camera 61 images a range or a direction overlapping the visual field of the user and images a direction gazed by the user. The breadth of an angle of view of the camera 61 can be set as appropriate. In this embodiment, the breadth of the angle of view of the camera 61 is set to image the entire visual field of the user visually recognizable by the user through the right light guide plate 26 and the left light guide plate 28.

The image display section 20 includes a distance measurement sensor 62 that detects a distance to a measurement target object located in a preset measurement direction. A measurement direction of the distance measurement sensor 62 can be set to the front side direction of the HMD 100 (a direction overlapping the imaging direction of the camera 61). The distance measurement sensor 62 can be configured by, for example, a light emitting section such as an LED or a laser diode and a light receiving section that receives reflected light of light emitted by a light source and reflected on the measurement target object. In this case, the distance is calculated by triangulation processing and distance measurement processing based on a time difference. The distance measurement sensor 62 may be configured by, for example, an emitting section that emits ultrasound and a receiving section that receives the ultrasound reflected on the measurement target object. In this case, the distance is calculated by the distance measurement processing based on a time difference. The camera 61 and/or the distance measurement sensor 62 constitute an object detection sensor configured to detect a movement of a physical object in a space corresponding to the virtual three-dimensional model AR displayed by the image display section 20.

In FIG. 1, the control device 10 and the image display section 20 are connected by a connection cable 40. The connection cable 40 is detachably connected to a connector provided in the control device 10 and is connected to various circuits inside the image display section 20. The connection cable 40 includes a metal cable or an optical fiber cable for transmitting digital data. The connection cable 40 may further include a metal cable for transmitting analog data. A connector 46 is provided halfway in the connection cable 40.

The connector 46 is a jack to which a stereo mini plug is connected. The connector 46 and the control device 10 are connected by, for example, a line for transmitting an analog sound signal. In a configuration example shown in FIG. 1, a head set 30 including a right earphone and a left earphone and a microphone 63 is connected to the connector 46.

Alternatively, an audio system having functions of the head set 30 may be incorporated in the display section 20.

Figure 3:
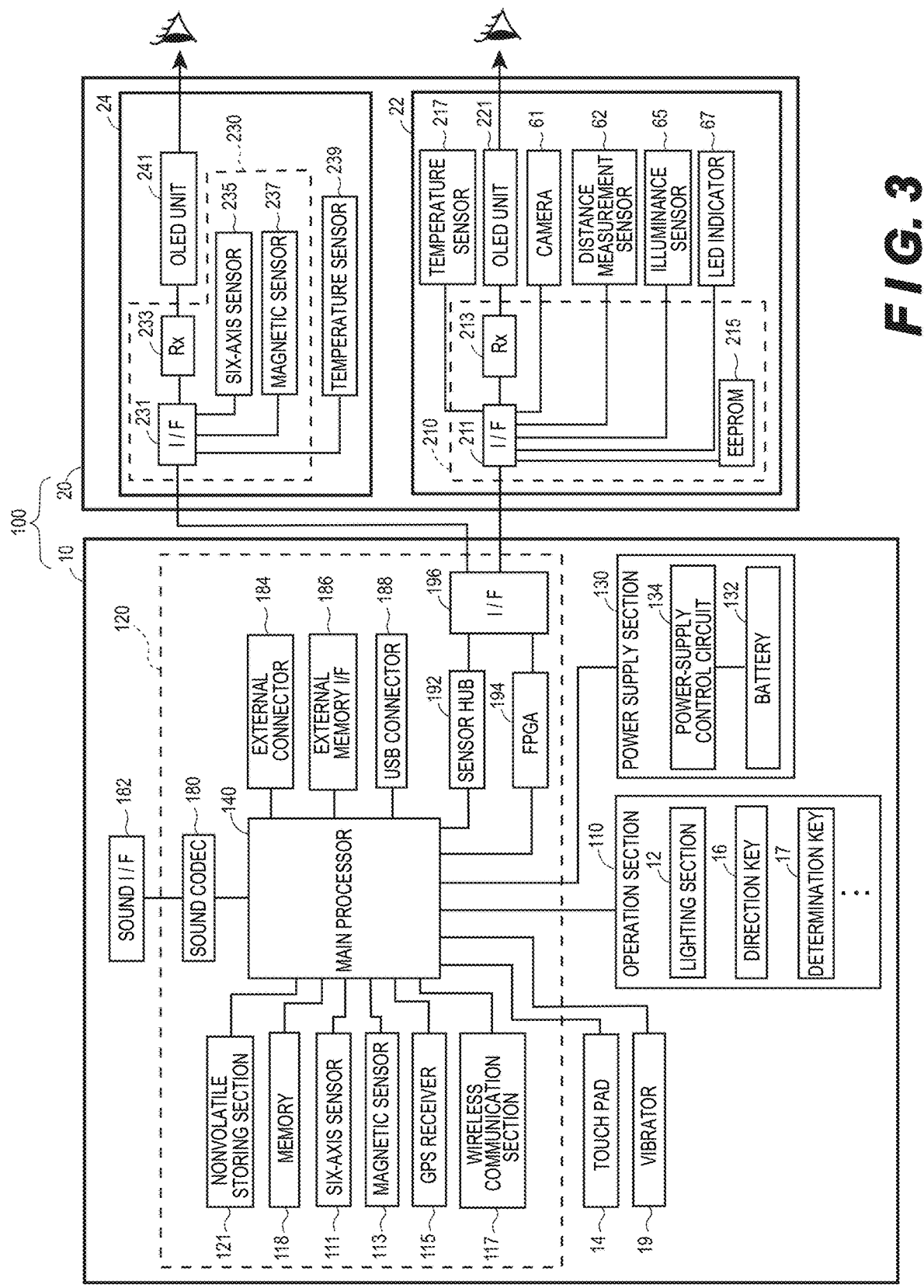
FIG. 3 is a block diagram illustrating functional components of a head-mounted display device according to the embodiment.

For example, as shown in FIG. 1, the microphone 63 is disposed such that a sound collecting section of the microphone 63 faces a line of sight direction of the user. The microphone 63 collects sound and outputs a sound signal to a sound interface 182 (FIG. 3). The microphone 63 may be a monaural microphone or may be a stereo microphone, may be a microphone having directivity, or may be a nondirectional microphone.

The control device 10 is a device for controlling the HMD 100. Examples of the control device 10 includes a controller, a mobile device, a tablet computer, a laptop computer, a wearable computer, a desktop computer, a smartphone, and any other system that is capable of communicating with the image display section 20 and the unmanned aircraft 400. In this example, the control device 10 is a portable device that allows the user to carry it to the site of flight execution. The control device 10 includes a lighting section 12, a touch pad 14, a direction key 16, a determination key 17, and a power switch 18. The lighting section 12 notifies, with a light emitting form thereof, an operation state (e.g., ON or OFF of a power supply) of the HMD 100. As the lighting section 12, for example, an LED (Light Emitting Diode) can be used.

The touch pad 14 detects touch operation on an operation surface of the touch pad 14 and outputs a signal corresponding to detection content. As the touch pad 14, various kinds of touch pads such as an electrostatic type, a pressure detection type, and an optical type can be adopted. The direction key 16 detects pressing operation on keys corresponding to the upward, downward, left, and right directions and outputs a signal corresponding to detection content. The determination key 17 detects pressing operation and outputs a signal for determining content of operation in the control device 10. The power switch 18 detects slide operation of the switch to change a state of the power supply of the HMD 100.

FIG. 3 is a block diagram functionally showing the configuration of the HMD 100. The control device 10 includes a main processor 140 that executes a computer program to control the HMD 100, a storing section, an input/output section, sensors, an interface, and a power supply section 130. The storing section, the input/output section, the sensors, the interface, and the power supply section 130 are connected to the main processor 140. The main processor 140 is mounted on a controller board 120 incorporated in the control device 10.

The storing section includes a memory 118 and a nonvolatile storing section 121. The memory 118 configures a work area that temporarily stores computer programs executed by the main processor 140 and data processed by the main processor 140. The nonvolatile storing section 121 is configured by a flash memory or an eMMC (embedded Multi Media Card). The nonvolatile storing section 121 stores the computer programs executed by the main processor 140 and various data processed by the main processor 140. In this embodiment, the nonvolatile storing section 121 constitutes a non-transitory machine readable medium storing a program for setting a target flight path of an aircraft in a physical environment. In this embodiment, these storing sections are mounted on the controller board 120.

The input/output section includes the touch pad 14 and an operation section 110. The operation section 110 includes the direction key 16, the determination key 17, and the power switch 18 included in the control device 10. The main processor 140 controls these input/output sections and acquires signals output from the input/output sections.

The sensors include a six-axis sensor 111, a magnetic sensor 113, and a GPS (Global Positioning System) receiver 115. The six-axis sensor 111 is a motion sensor (an inertial sensor) including a three-axis acceleration sensor and a three-axis gyro (angular velocity) sensor. As the six-axis sensor 111, an IMU (Inertial Measurement Unit) obtained by modularizing the sensors may be adopted. The magnetic sensor 113 is, for example, a three-axis terrestrial magnetism sensor. The GPS receiver 115 includes a not-shown GPS antenna, receives radio signals transmitted from GPS satellites, and detects a coordinate of a present position of the control device 10. The sensors (the six-axis sensor 111, the magnetic sensor 113, and the GPS receiver 115) output detection values to the main processor 140 according to a sampling frequency designated in advance. Timing when the sensors output the detection values may correspond to an instruction from the main processor 140. Conventional localization systems other than the GPS system described herein may be used to determine a location/orientation of a user and/or the HMD 100.

The interface includes a wireless communication section 117, a sound codec 180, an external connector 184, an external memory interface 186, a USB (Universal Serial Bus) connector 188, a sensor hub 192, an FPGA 194, and an interface 196. These components function as interfaces with the outside. The wireless communication section 117 executes wireless communication between the HMD 100 and an external apparatus. The wireless communication section 117 includes an antenna, an RF circuit, a baseband circuit, and a communication control circuit not shown in the figure. Alternatively, the wireless communication section 117 is configured as a device obtained by integrating these components. The wireless communication section 117 performs wireless communication conforming to standards such as Bluetooth (registered trademark) and a wireless LAN including Wi-Fi (registered trademark).

The sound codec 180 is connected to the sound interface 182 and performs encoding/decoding of sound signals input and output via the sound interface 182. The sound interface 182 is an interface that inputs and outputs sound signals. The sound codec 180 may include an A/D converter that performs conversion from an analog sound signal into digital sound data and a D/A converter that performs conversion opposite to the conversion of the A/D converter. The HMD 100 in this embodiment outputs sound from the left and right earphones and collects sound with the microphone 63. The sound codec 180 converts digital sound data output by the main processor 140 into an analog sound signal and outputs the analog sound signal via the sound interface 182. The sound codec 180 converts an analog sound signal input to the sound interface 182 into digital sound data and outputs the digital sound data to the main processor 140.

The external connector 184 is a connector for connecting external devices (e.g., a personal computer, a smart phone, and a game machine), which communicate with the main processor 140, to the main processor 140. The external devices connected to the external connector 184 can be supply sources of contents and can be used for debugging of a computer program executed by the main processor 140 and collection of an operation log of the HMD 100. Various forms can be adopted as the external connector 184. As the external connector 184, for example, interfaces adapted to wired connection such as a USB interface, a micro USB interface, and an interface for memory card and interfaces adapted to wireless connection such as a wireless LAN interface and a Bluetooth interface can be adopted.

The external memory interface 186 is an interface to which a portable memory device is connectable. The external memory interface 186 includes, for example, a memory card slot, into which a card-type recording medium is inserted to enable reading and writing of data, and an interface circuit. A size, a shape, a standard, and the like of the card-type recording medium can be selected as appropriate. The USB connector 188 is an interface to which a memory device, a smartphone, a personal computer, and the like confirming to the USB standard are connectable. The USB connector 188 includes, for example, a connector conforming to the USB standard and an interface circuit. A size and a shape of the USB connector 188, a version of the USB standard, and the like can be selected as appropriate.

The HMD 100 includes a vibrator 19. The vibrator 19 includes a not-shown motor and a not-shown eccentric rotor. The vibrator 19 generates vibration according to the control by the main processor 140. For example, when operation on the operation section 110 is detected or when the power supply of the HMD 100 is turned on and off, the HMD 100 generates vibration with the vibrator 19 in a predetermined vibration pattern. The vibrator 19 may be provided on the image display section 20 side, for example, in the right holding section 21 of the image display section 20 (a right side portion of the temple) instead of being provided in the control device 10.

The sensor hub 192 and the FPGA 194 are connected to the image display section 20 via the interface (I/F) 196. The sensor hub 192 acquires detection values of the various sensors included in the image display section 20 and outputs the detection values to the main processor 140. The FPGA 194 executes processing of data transmitted and received between the main processor 140 and the sections of the image display section 20 and transmission of the data via the interface 196. The interface 196 is connected to the right display unit 22 and the left display unit 24 of the image display section 20. In an example in this embodiment, the connection cable 40 is connected to the left holding section 23. A wire connected to the connection cable 40 is laid inside the image display section 20. Each of the right display unit 22 and the left display unit 24 is connected to the interface 196 of the control device 10.

The power supply section 130 includes a battery 132 and a power-supply control circuit 134. The power supply section 130 supplies electric power for the control device 10 to operate. The battery 132 is a chargeable battery. The power-supply control circuit 134 performs detection of a residual capacity of the battery 132 and control of charging to an OS 143. The power-supply control circuit 134 is connected to the main processor 140 and outputs a detection value of the residual capacity of the battery 132 or a detection value of a voltage of the battery 132 to the main processor 140. The control device 10 may supply electric power to the image display section 20 on the basis of the electric power supplied by the power supply section 130. The main processor 140 may be capable of controlling a supply state of electric power from the power supply section 130 to the sections of the control device 10 and the image display section 20.

The right display unit 22 includes a display unit board 210, the OLED unit 221, the camera 61, the distance measurement sensor 62, an illuminance sensor 65, an LED indicator 67, and the temperature sensor 217. An interface (I/F) 211 connected to the interface 196, a receiving section (Rx) 213, and an EEPROM (Electrically Erasable Programmable Read-Only Memory) 215 are mounted on the display unit board 210. The receiving section 213 receives data input from the control device 10 via the interface 211. When receiving image data of an image displayed on the OLED unit 221, the receiving section 213 outputs the received image data to the OLED driving circuit in the OLED unit 221.

The EEPROM 215 stores various data in a form readable by the main processor 140. The EEPROM 215 stores, for example, data concerning a light emission characteristic and a display characteristic of the OLED units 221 and 241 of the image display section 20 and data concerning characteristics of the sensors of the right display unit 22 or the left display unit 24. Specifically, the EEPROM 215 stores, for example, parameters related to gamma correction of the OLED units 221 and 241, data for compensating for detection values of the temperature sensors 217 and 239, and the like. These data are generated by a test during factory shipment of the HMD 100 and written in the EEPROM 215. After the shipment, the main processor 140 reads the data in the EEPROM 215 and uses the data for various kinds of processing.

The camera 61 executes imaging according to a signal input via the interface 211 and outputs captured image data or a signal indicating an imaging result to the control device 10. As shown in FIG. 1, the illuminance sensor 65 is provided at the end portion ER of the front frame 27 and disposed to receive external light from the front of the user wearing the image display section 20. The illuminance sensor 65 outputs a detection value corresponding to a received light amount (light reception intensity). As shown in FIG. 1, the LED indicator 67 is disposed near the camera 61 at the end portion ER of the front frame 27. The LED indicator 67 is lit during execution of imaging by the camera 61 to inform that the imaging is being performed.

The temperature sensor 217 detects temperature of the circuits disposed in the right display unit 22, and outputs a voltage value or a resistance value corresponding to the detected temperature.

The left display unit 24 includes a display unit board 230, the OLED unit 241, and the temperature sensor 239. An interface (IN) 231 connected to the interface 196, a receiving section (Rx) 233, a six-axis sensor 235, and a magnetic sensor 237 are mounted on the display unit board 230. The receiving section 233 receives data input from the control device 10 via the interface 231. When receiving image data of an image displayed on the OLED unit 241, the receiving section 233 outputs the received image data to the OLED driving circuit of the OLED unit 241.

The six-axis sensor 235 is a motion sensor (an inertial sensor) including a three-axis acceleration sensor and a three-axis gyro (angular velocity) sensor. As the six-axis sensor 235, an IMU sensor obtained by modularizing the sensors may be adopted. The magnetic sensor 237 is, for example, a three-axis terrestrial magnetism sensor. The six-axis sensor 235 and the magnetic sensor 237 are provided in the image display section 20. Therefore, when the image display section 20 is worn on the head of the user, the six-axis sensor 235 and the magnetic sensor 237 detect a movement of the head of the user. The direction of the image display section 20 is specified and the visual field of the user is specified from the detected movement of the head. Note that the HMD 100 is also capable of specifying the direction of the image display section 20 and the visual field of the user using an imaging result of the camera 61, radio wave intensity of wireless communication from the unmanned aircraft 400.

The temperature sensor 239 detects temperature of the circuits disposed in the left display unit 24 and outputs a voltage value or a resistance value corresponding to the detected temperature.

The camera 61, the distance measurement sensor 62, the illuminance sensor 65, and the temperature sensor 217 of the right display unit 22 and the six-axis sensor 235, the magnetic sensor 237, and the temperature sensor 239 of the left display unit 24 are connected to the sensor hub 192 of the control device 10. The sensor hub 192 performs setting and initialization of sampling cycles of the sensors according to the control by the main processor 140. The sensor hub 192 executes energization to the sensors, transmission of control data, acquisition of detection values, and the like according to the sampling cycles of the sensors. The sensor hub 192 outputs detection values of the sensors included in the right display unit 22 and the left display unit 24 to the main processor 140 at preset timing. The sensor hub 192 may include a cache function of temporarily retaining the detection values of the sensors. The sensor hub 192 may include a conversion function for a signal format and a data format of the detection values of the sensors (e.g., a conversion function into a unified format). The sensor hub 192 starts and stops energization to the LED indicator 67 according to the control by the main processor 140 to light or extinguish the LED indicator 67.

Although illustration and detailed explanation are omitted, the unmanned aircraft 400 controlled by the remote control device 500 is an unmanned aerial vehicle capable of flying according to remote piloting from the remote control device 500. The unmanned aircraft 400 is an unmanned aerial vehicle capable of performing autonomous flight according to flight control data stored in advance in a storing section mounted on the unmanned aerial vehicle. The unmanned aircraft 400 is mounted with various sensors such as a GPS sensor (a GPS receiver), an altitude sensor, an IMU sensor, and an image sensor. The unmanned aircraft 400 transmits, at any time, information corresponding to the mounted sensors such as a present position, altitude, speed, a moving direction, a posture, and an aerially photographed image to the remote control device 500 by wireless communication. The remote control device 500 and the control device 10 of the HMD 100 may be integrated into a single physical device such as a mobile device, a tablet computer, a laptop computer, a wearable computer, a smartphone, and any other system.

The unmanned aircraft 400 may include an onboard control device that receives and executes the specifications of the target flight path. For example, the onboard device includes a memory and a processor that coordinate and automatically execute the specifications of the target flight path.

Figure 4:
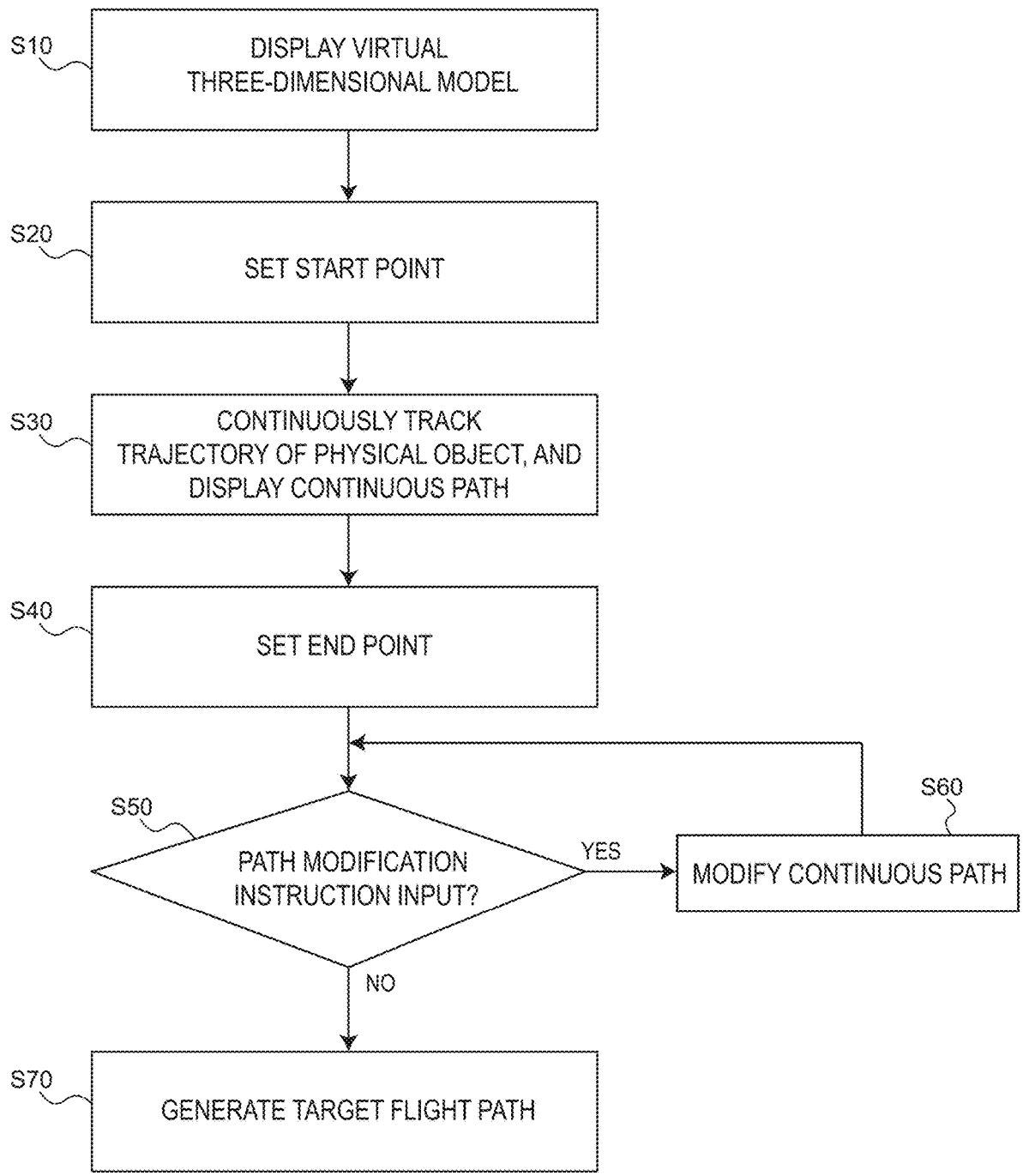
FIG. 4 is a flowchart explaining a method for setting a target flight path of an aircraft in a physical environment according to the embodiment of the present invention.

Referring now to a flowchart of FIG. 4, a method for setting a target flight path of an aircraft in a physical environment according to one embodiment will be explained in detail. In this embodiment, the control process in FIG. 4 is implemented on the HMD 100 shown in FIG. 1, which is an example of the target flight path setting system.

In step S10, the image display section 20 of the HMD 100 is configured to display a virtual three-dimensional model AR corresponding to the physical environment. More specifically, the virtual three-dimensional model AR of the physical environment where the unmanned aircraft 400 is to be operated is displayed. The virtual three-dimensional model AR corresponds to the physical environment in which the unmanned aircraft 400 is to be operated. Thus, the virtual three-dimensional model AR may be a virtual model of a location, an area, a building, and/or a room where the unmanned aircraft 400 is to be operated. The virtual three-dimensional model AR may be loaded from a third party online provider or an existing map repository source. Alternatively, the virtual three-dimensional model AR may be generated by previous flight information obtained by the unmanned aircraft 400 itself or other aircraft (e.g., generated using satellite imagery, aerial photography, etc.) and stored in the memory such as the storing section 121 or an external memory device in advance. The virtual three-dimensional model AR displayed in step S10 may include computer graphics and rendered three-dimensional visual objects that have been shaped and textured based on their corresponding real physical counterparts in the physical environment.

In this embodiment, the HMD 100 is configured to provide a virtual three-dimensional model AR via an augmented reality display as shown in FIG. 2. The image display section 20 worn by the user allows virtual objects to be displayed over a flat surface of a physical environment (e.g., the table) to create an appearance that the virtual three-dimensional model AR is held up on the physical table. In the example shown in FIG. 2, the virtual three-dimensional model AR is a small scale model of the physical environment to create a virtual image that the user is looking over the physical environment from above. Even when the user moves the head on which the HMD 100 is mounted, by tracking movement of the image display section 20 and/or a physical object (e.g., the user's hand) placed within the virtual three-dimensional model AR, the virtual three-dimensional model AR displayed on the image display section 20 can be appropriately updated to maintain the virtual image of the scaled virtual three-dimensional model AR placed on the table and viewed from a different angle/location.

Figure 5:
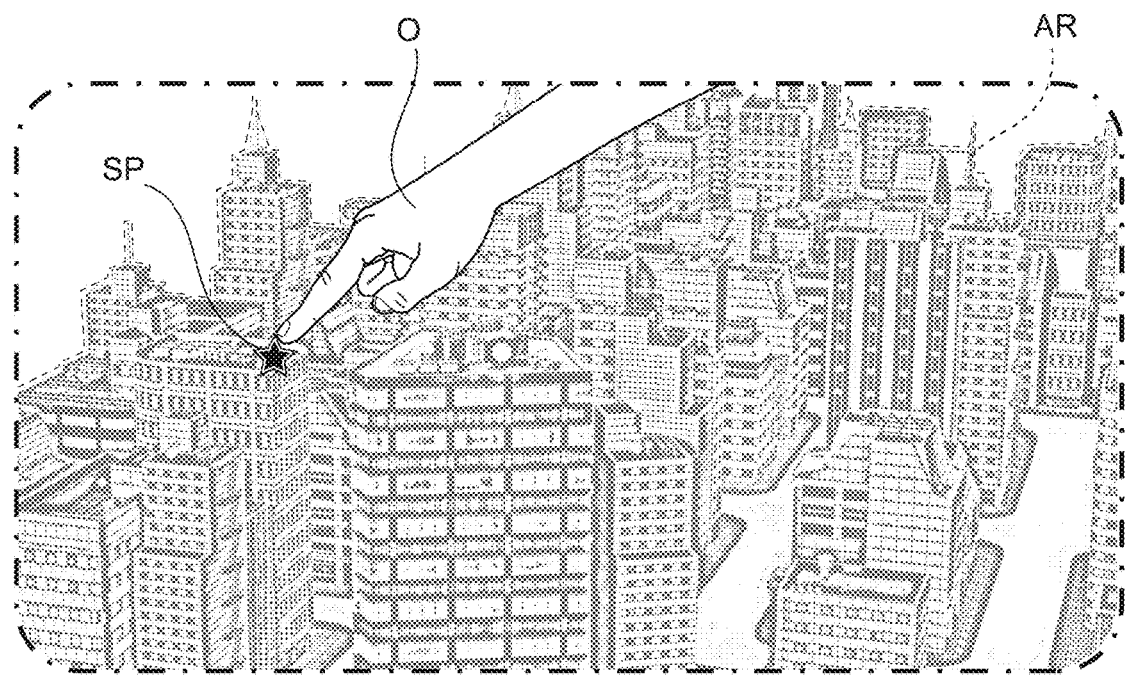
FIG. 5 is a schematic diagram illustrating a step for setting a start point of a target flight path within the virtual three-dimensional model in the method for setting the target flight path according to the embodiment.

In step S20, the HMD 100 is configured to set a start point SP in the virtual three-dimensional model AR according to a user input indicative of a position of the start point SP. As shown in FIG. 5, the start point SP may be set by first detecting a physical object O within the virtual three-dimensional model, and then receiving a user instruction to set the position of the detected physical object O as the start point SP of the target flight path. The physical object O may be a user's body part (e.g., hand(s), finger(s)), or an item such as a model or replica of the unmanned aircraft 400 held by the user. As the physical object O, instead of simply pointing a finger, the user may form a prescribed shape using hands and/or fingers (e.g., makes a circular shape with fingers) and the location and orientation of the prescribed shape may be used as the physical object O to be tracked.

The user instruction indicative of a position of the start point SP may include pressing a button or buttons on the HMD 100, performing a gesture indicative of setting the start point SP, giving voice commands, inputting gaze commands (e.g., eye-gaze and/or head-gaze) and the like. Alternatively, the user's line of sight may be displayed as a cursor on the image display section 20 as being superimposed on the virtual three-dimensional model AR, and the start point SP is set to a position where the cursor is placed when the user instruction is received. Further alternatively, the coordinates or values indicative of the position of the start point SP may be directly entered on the HMD 100.

In step S30, the HMD 100 is configured to start continuously tracking a trajectory of the physical object O moved in a space corresponding to the virtual three-dimensional model AR while displaying within the virtual three-dimensional model AR a continuous path P corresponding to the trajectory of the physical object O from the start point SP. In this augmented reality three-dimensional model AR, the user can interact with virtual objects and indicate the trajectory of the target flight path using the physical object O placed in the virtual three-dimensional model AR. In this step, the HMD 100 is configured to start tracking the trajectory of the physical object O upon receiving a user instruction and to start generating the trajectory. The user instruction may include moving the physical object O from the starting point SP, pressing a button or buttons on the HMD 100, performing a gesture indicative of setting the start point SP, giving voice commands, inputting gaze commands (e.g., eye-gaze and/or head-gaze) and the like. Alternatively, the HMD 100 may be configured to start generation of the trajectory when the physical object O is reaches a prescribed distance or less from the starting point SP set in S10. The process in step S30 may be performed simultaneously as the process in step S20.

Figure 6:
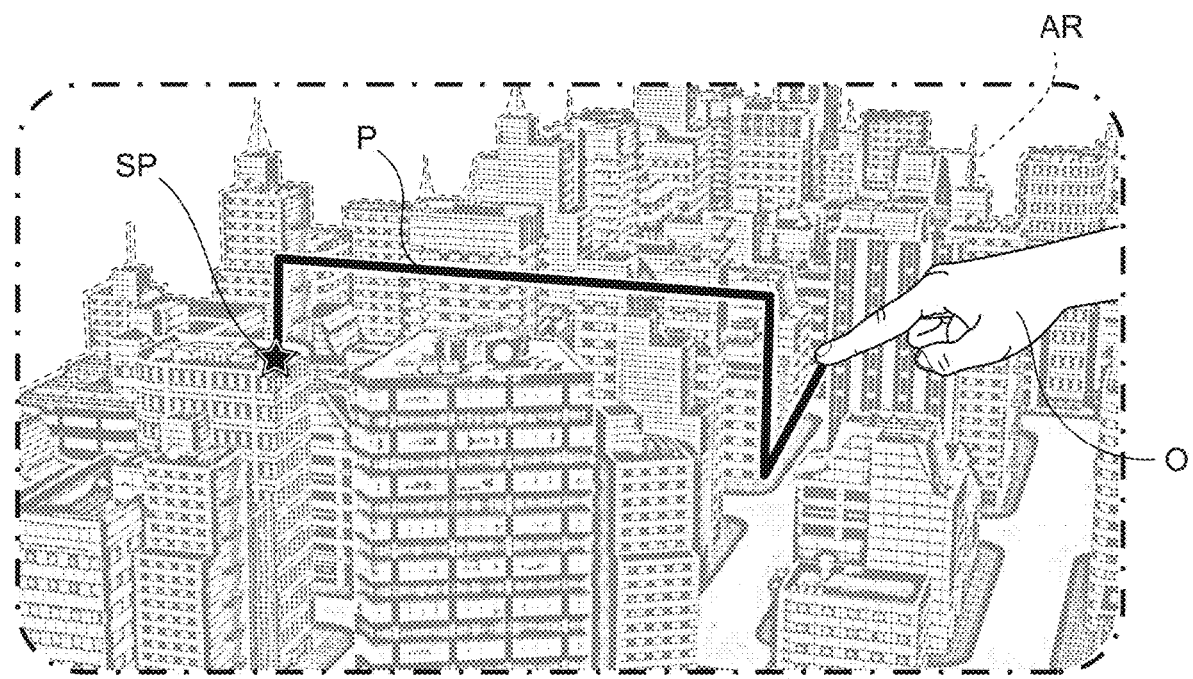
FIG. 6 is a schematic diagram illustrating a step for continuously tracking a trajectory of a physical object while displaying a continuous path within the virtual three-dimensional model in the method for setting the target flight path according to the embodiment.

Tracking the physical object O may include tracking an orientation of the physical object O in addition to a location coordinate of the physical object O within the virtual three-dimensional model AR. The orientation of the physical object O corresponds to the orientation of the unmanned aircraft 400. The HMD 100 is configured to continuously track movement of the physical object O using localization systems and/or sensors (e.g., the camera 61, the distance measurement sensor 62, etc.). The HMD 100 is configured to continuously store the movement of the physical object O as a trajectory, and display the continuous path P within the virtual three-dimensional model AR as shown in FIG. 6. The continuous path P corresponds to the trajectory of the physical object O from the start point SP.

Figure 7:
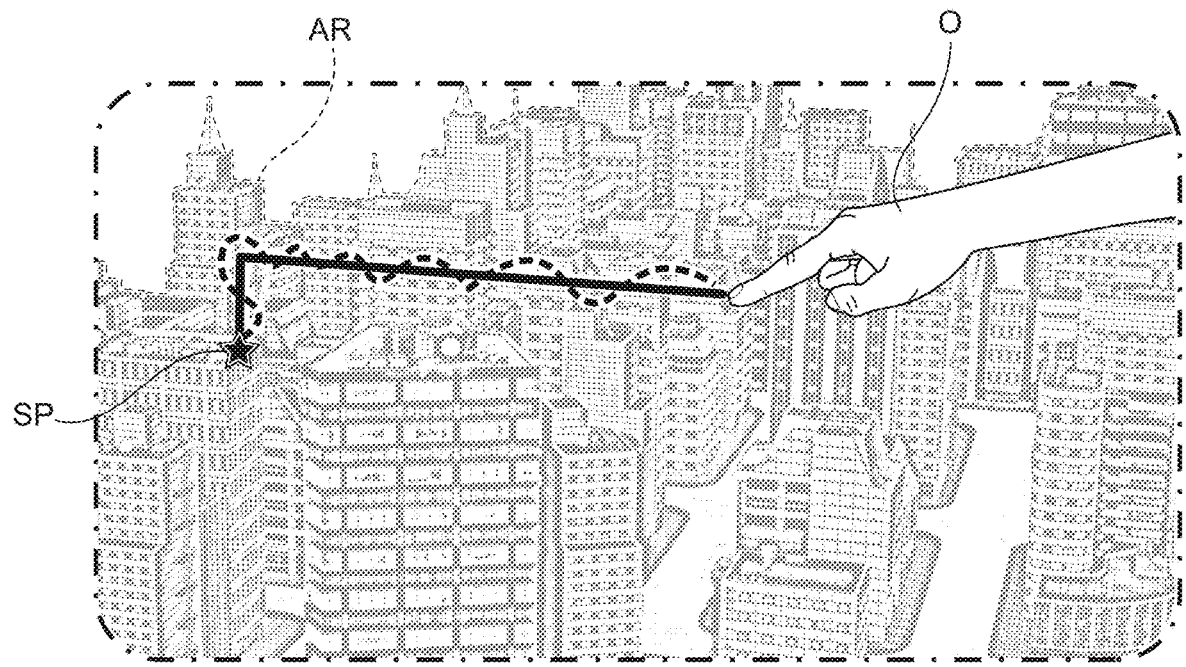
FIG. 7 is a schematic diagram illustrating a step for correcting the trajectory of the physical object in the method for setting the target flight path according to the embodiment.
Figure 8:
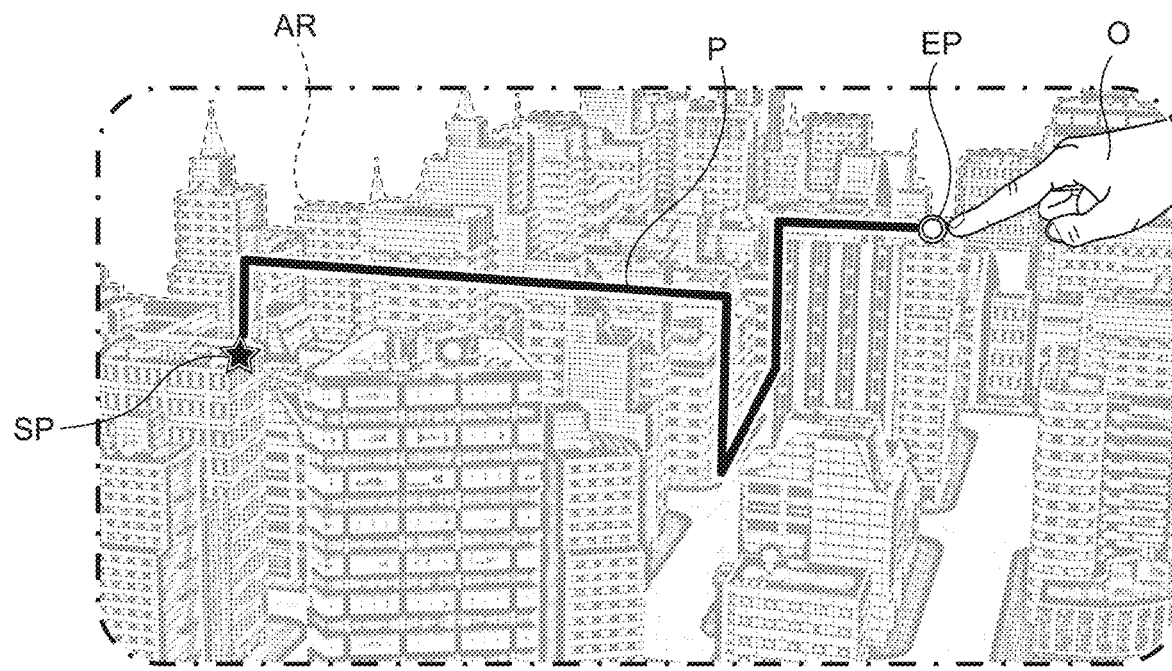
FIG. 8 is a schematic diagram illustrating a step for setting an end point of the continuous path within the virtual three-dimensional model in the method for setting the target flight path according to the embodiment.

The precise movement of the physical object O may be translated into the trajectory and displayed on the image display section 20 as the continuous path P. As shown in FIG. 7, the trajectory is preferably corrected in order to remove jaggedness caused by unintentional shaking of the physical object O during movement so that a relatively smooth continuous path P is formed and displayed. In FIG. 7, the actual trajectory of the physical object O is shown with the dotted line, and the corrected trajectory (continuous path P) is shown with the solid line. A conventional noise removal algorithm such as a moving average method may be used as the correction method. In other words, displaying of the continuous path P within the virtual three-dimensional model AR may include reducing noise in data of the trajectory of the physical object O to generate display data of the continuous path P. Accordingly, a smooth target flight path without jaggedness caused by the unintentional shaking of the physical objection O can be obtained, thereby preventing unintentional and unnecessary movements of the unmanned aircraft 400 when the target flight path is executed.

In step S40, the HMD 100 is configured to set an end point EP of the continuous path P in the virtual three-dimensional model AR according to a user input indicative of a position of the end point EP. The end point EP is set when a user instruction to set the end point EP of the target flight path is received. The user instruction may include pressing a button buttons on the HMD 100, performing a gesture indicative of setting the end point EP, giving voice commands, inputting gaze commands (e.g., eye-gaze and/or head-gaze) etc. Alternatively, the coordinates or values indicative of the position of the end point EP may be directly entered on the HMD 100.

In step S50, the HMD 100 is configured to determine whether or not a user input for initiating a modification process of the continuous path P has been received. The user input may include pressing a button or buttons on the HMD 100, performing a prescribed gesture indicative of initiation of the modification process, giving voice commands, inputting gaze commands (e.g., eye-gaze and/or head-gaze) and the like. If it is determined that the user input for initiating the modification process is received (Yes), the control flow proceeds to step S60. Otherwise, the control flow proceeds to step S70.

Figure 9:
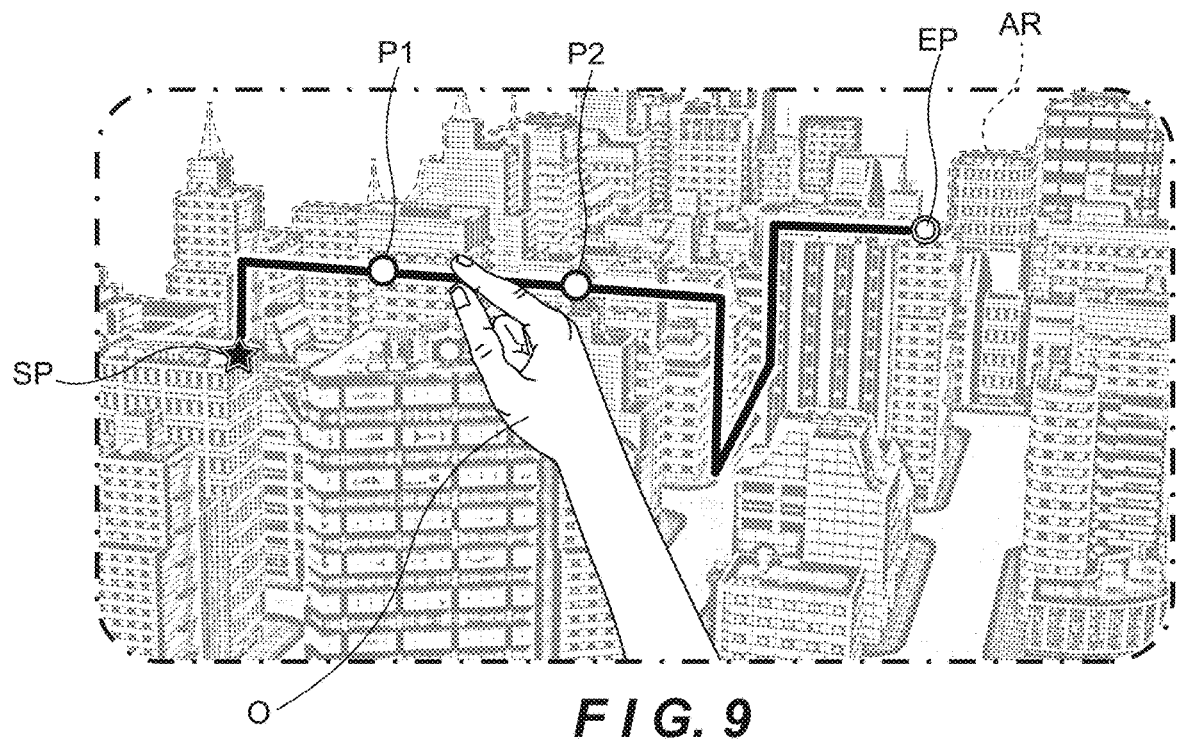
FIG. 9 is a schematic diagram illustrating a part of a step for modifying the continuous path within the virtual three-dimensional model in the method for setting the target flight path according to the embodiment.
Figure 10:
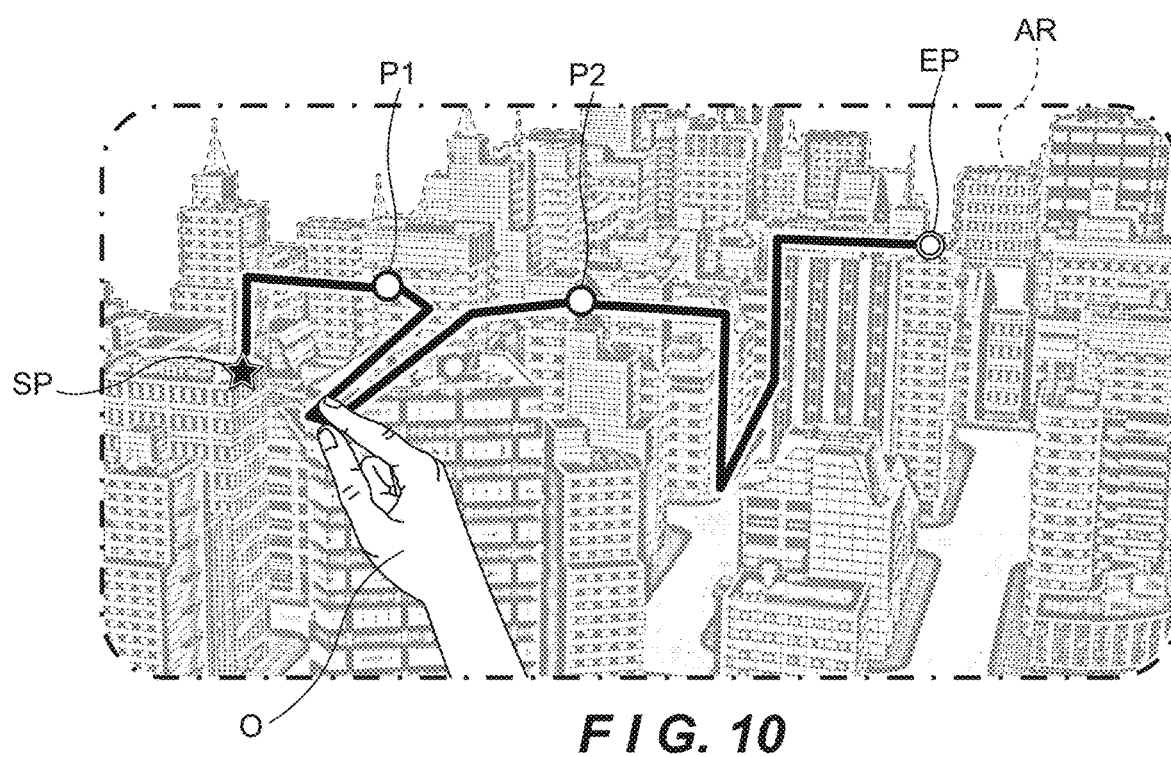
FIG. 10 is a schematic diagram illustrating another part of the step for modifying the continuous path within the virtual three-dimensional model subsequent to the step illustrated in FIG. 9.

In step S60, the HMD 100 is configured to modify the continuous path P according to the user's instruction. The HMD 100 may be configured to recognize a movement of the physical object O indicative of a deformation of a segment of the continuous path P. For example, the HMD 100 may be configured to recognize user's gesture controls for editing or modifying the trajectory of the continuous path P that is being displayed in the virtual three-dimensional model AR. When the modification process is performed, the HMD 100 may be configured to respond to the user's gesture controls to create a virtual image that the displayed continuous path P is directly operated by operation of the physical object O such as user's fingers as shown in FIGS. 9 and 10. For example, the user may bring the fingers close to the displayed continuous path P, perform a gesture of grabbing a part of the continuous path P by a pinching motion of the fingers as shown in FIG. 9. Then the user may move the fingers toward a desired location within the virtual three-dimensional model AR to modify the trajectory of the continuous path P as shown in FIG. 10. Therefore, the continuous path P can be modified to a desired shape in an intuitive manner with a simple operation. Alternatively, the continuous path P may be modified by, for example, selecting a position of the continuous path P to be grabbed and moved by pressing a button or buttons on the HMD 100, performing a different gesture other than the pinching motion indicative of grabbing the position, giving voice commands, inputting gaze commands (e.g., eye-gaze and/or head-gaze) and the like.

The area of the continuous path P that has been modified as described above should be continuously and smoothly connected to the rest of the continuous path P after modification. This can be achieved by specifying a segment of the continuous path P to be modified before the grabbing and moving motions. As shown in FIGS. 9 and 10, the HMD 100 is configured to set a first point P1 and a second point P2 along the continuous path P according to the user's instructions, and the HMD 100 is configured to deform only the specified segment of the continuous path P between the first point P1 and the second point P2 in the virtual three-dimensional model AR without moving the first point P1 and the second point P2. The first point P1 and the second point P2 may be set by the same manner as the start point SP in step S20 or the end point EP in step S40. Accordingly, the continuous path P can be continuously and smoothly connected to the rest of the continuous path P after modification. Thus, the target flight path that is continuous from the start point SP to the end point EP without an undesired sudden change in the travel direction can be avoided, and in-flight errors and malfunction can be prevented.

The HMD 100 is configured to repeat the modification process in step S60 until it is determined that no user input is received for initiating the modification process in step S50.

In step S70, the HMD 100 is configured to generate the target flight path of the unmanned aircraft 400 in the physical environment based on data of the continuous path P from the start point SP to the end point EP in the virtual three-dimensional model AR. The target flight path may include information indicative of various control parameters for the aircraft (e.g., flight speed) and/or for the on-board devices (e.g., camera angles, device activation timings, etc.) in addition to the route information. The HMD 100 may be configured to accept the user inputs of the control parameters while the physical object O is being tracked in step S20. The user may also input the control parameters after drawing of the continuous path P is completed, by specifying desired locations at which the control parameters are to be executed. The HMD 100 may be configured to display the control parameters along the continuous path P in the virtual three-dimensional model AR.

The target flight path generated using the method described above may be translated/packaged into a trajectory plan format for controlling the unmanned aircraft 400. The HMD 100 may store the trajectory plan and send the trajectory plan to the remote control device 500 of the unmanned aircraft 400. Then, the trajectory plans may be executed by the unmanned aircraft 400.

Figure 11:
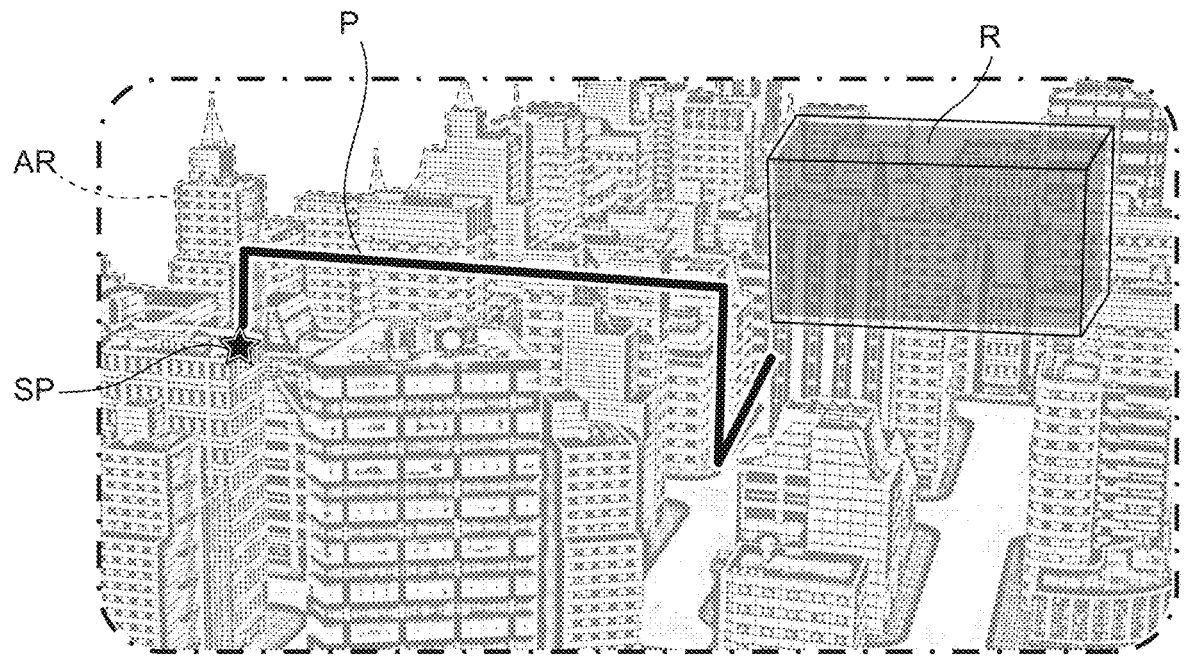
FIG. 11 is a schematic diagram illustrating a display of a restricted area in the virtual-three-dimensional model according to the embodiment.

The HMD 100 may be further configured to display in the virtual three-dimensional model AR information on obstacles, buildings, restricted flight zones, layout, etc. so that the user can avoid restricted locations. FIG. 11 shows an example where a restricted flight zone R is displayed in the virtual three-dimensional model AR. The information to be displayed may be obtained from the Automatic Dependent Surveillance-Broadcast (ADS-B), which provides pertinent updates in the airspace ranging from temporary flight restrictions to runway closings. The user can visualize even the obstacles that are not physically exist such as the restricted flight zones. Therefore, a target flight path that surely avoids these obstacles can be set.

The HMD 100 may be further configured to issue a notification when the physical object O enters a region corresponding to the restricted area in the virtual three-dimensional model AR. The notification may be any type of notifications such as visual, auditory, haptic, etc. The user can be made aware of the restricted area while the user sets a target flight path. Therefore, a target flight path that surely avoids these obstacles can be set.

Figure 12:
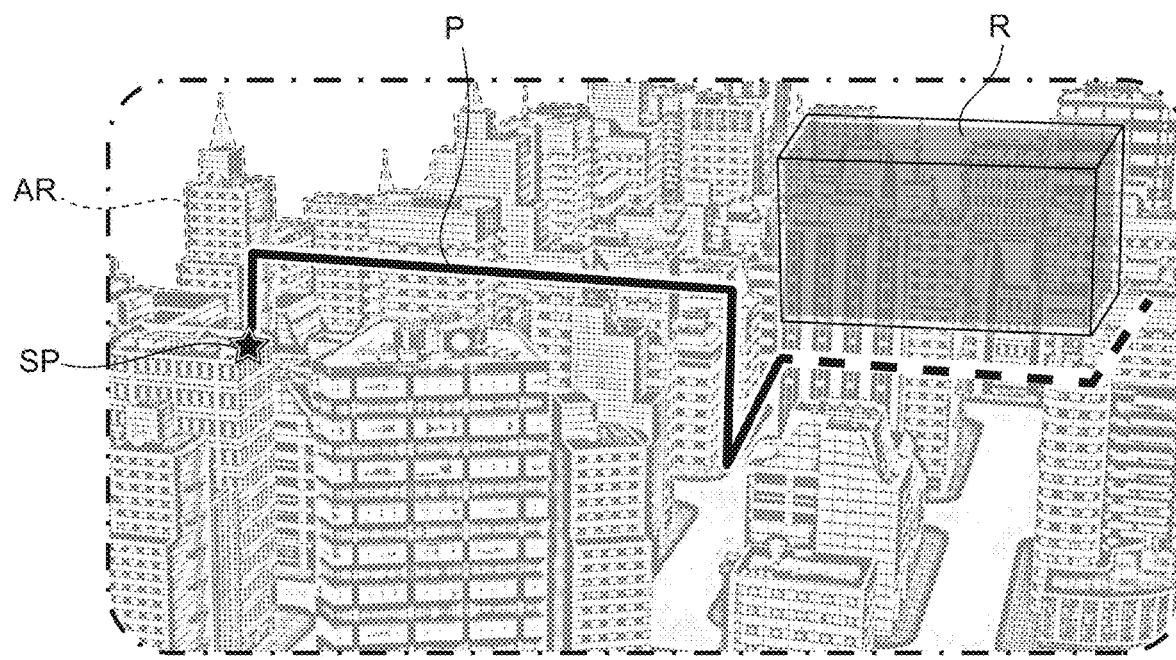
FIG. 12 is a schematic diagram illustrating a display of an alternate route that avoids the restricted area in the virtual-three-dimensional model according to the embodiment.

The HMD 100 may be further configured to display an alternate route that avoids the restricted area when the physical object enters a region corresponding to the restricted area in the virtual three-dimensional model AR. FIG. 12 shows a display of the alternate route (shown with a dotted line) that avoids the restricted flight zone R. The user can set a target flight path that surely avoids the restricted area by simply adopting the alternate route.

Figure 13:
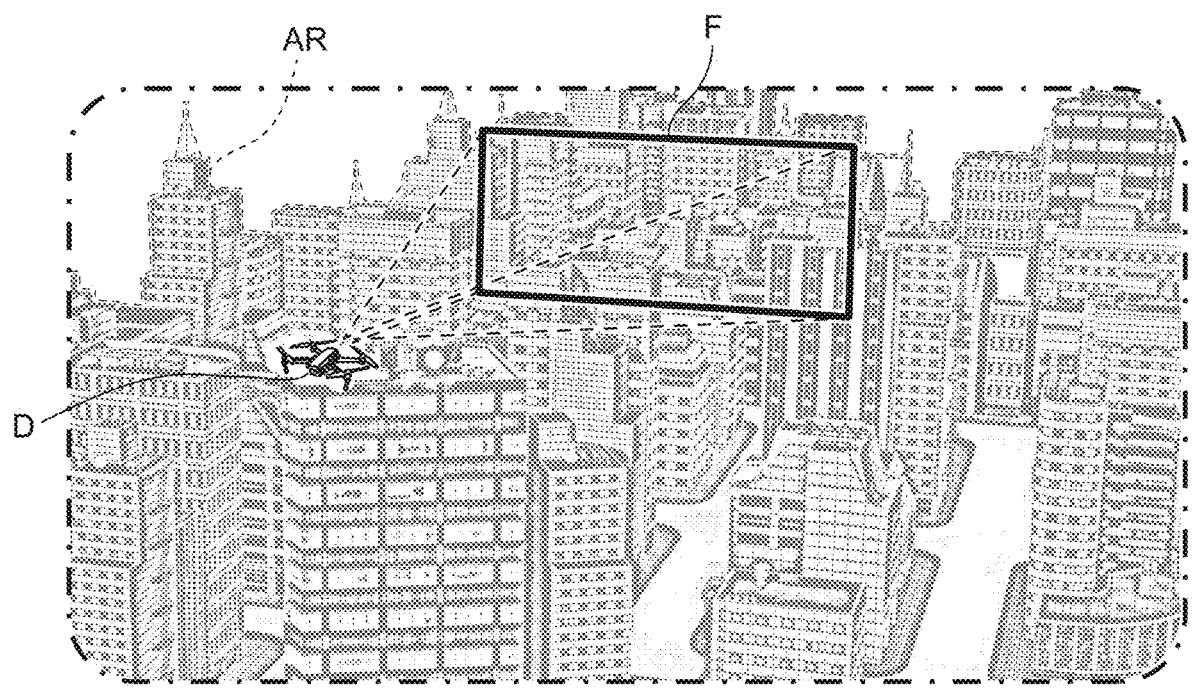
FIG. 13 is a schematic diagram illustrating a display of a frame indicative of an image capturing area by an image sensor mounted on the aircraft in the virtual-three-dimensional model according to the embodiment.

The HMD 100 may be further configured to display in the virtual three-dimensional model AR a frame F as shown in FIG. 13. The frame F is indicative of an image capturing area by an image sensor (e.g., a camera) mounted on the unmanned aircraft 400 when the unmanned aircraft 400 is assumed to be at a position in the physical environment corresponding to a prescribed position along the continuous path P in the virtual three-dimensional model AR. An icon D representing the unmanned aircraft 400 may also be displayed as shown in FIG. 13. The HMD 100 may be configured to accept the user's input to manipulate the icon D within the virtual three-dimensional model AR to adjust a position, a size, an angle, etc. of the frame F. The user can clearly understand the imaging capturing area rather than displaying the image to be captured. The user can adjust the position and the orientation of the physical object O in the virtual three-dimensional model AR in order to determine the position and orientation that can achieve the desired image capturing area. Also, displaying the image frame can be processed faster than generating a new image to be captured at an arbitrary position. Therefore, the time and processor load can be shortened compared to the system that generates an image to be captured.

Figure 14:
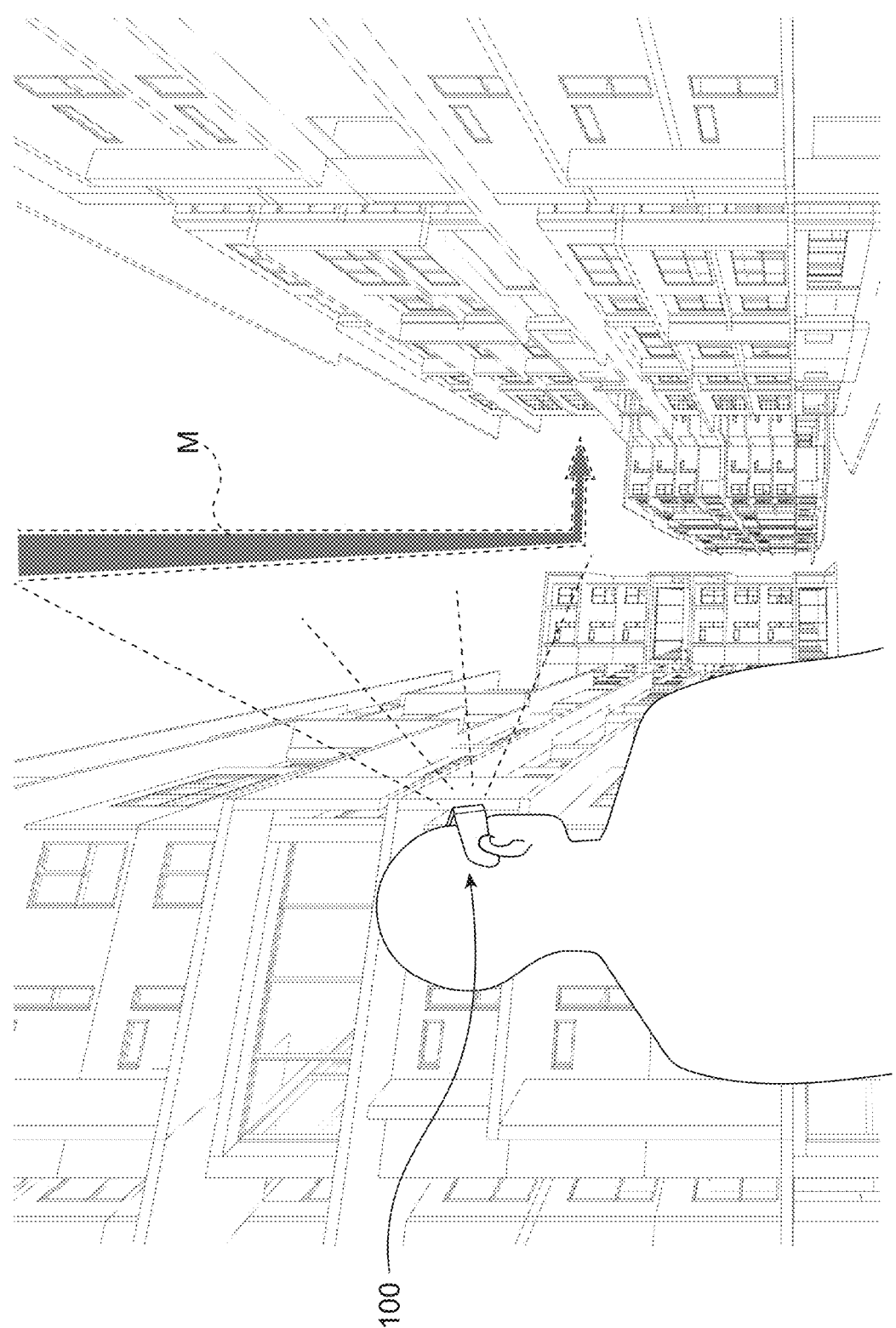
FIG. 14 is a schematic diagram illustrating a display of a route marker corresponding to at least a portion of the continuous path as being superimposed on a real-world view of the physical environment according to the embodiment.

The HMD 100 may be further configured to display a route marker corresponding to at least a portion of the continuous path P as being superimposed on a real-world view of the physical environment. The target flight path may be set in advance in a location remote from the physical environment, or the target flight path may be set on site in the physical environment. When the target flight path is set on site, the HMD 100 may be configured to display the virtual three-dimensional model AR on the ground or table on the site, and simultaneously display the route marker M as being superimposed on a real-world view of the physical environment. For example, as shown in FIG. 14, the route marker M may be an arrow corresponding to a part of the continuous path P. The trajectory linked to the three-dimensional model AR and the trajectory linked to buildings in the real space may be displayed simultaneously. In this way, the user can confirm the target flight path more reliably and accurately.

The HMD 100 may be further configured to switch between a first display mode in which the virtual three-dimensional model AR is displayed and a second display mode in which the route marker M is displayed according to a user input. The first display mode and the second display mode may be switched according to the user input such as moving the user's head to switch the line of sight, pressing a button or buttons on the HMD 100, voice commands, inputting gaze commands (e.g., eye-gaze and/or head-gaze) etc.

Figure 15:
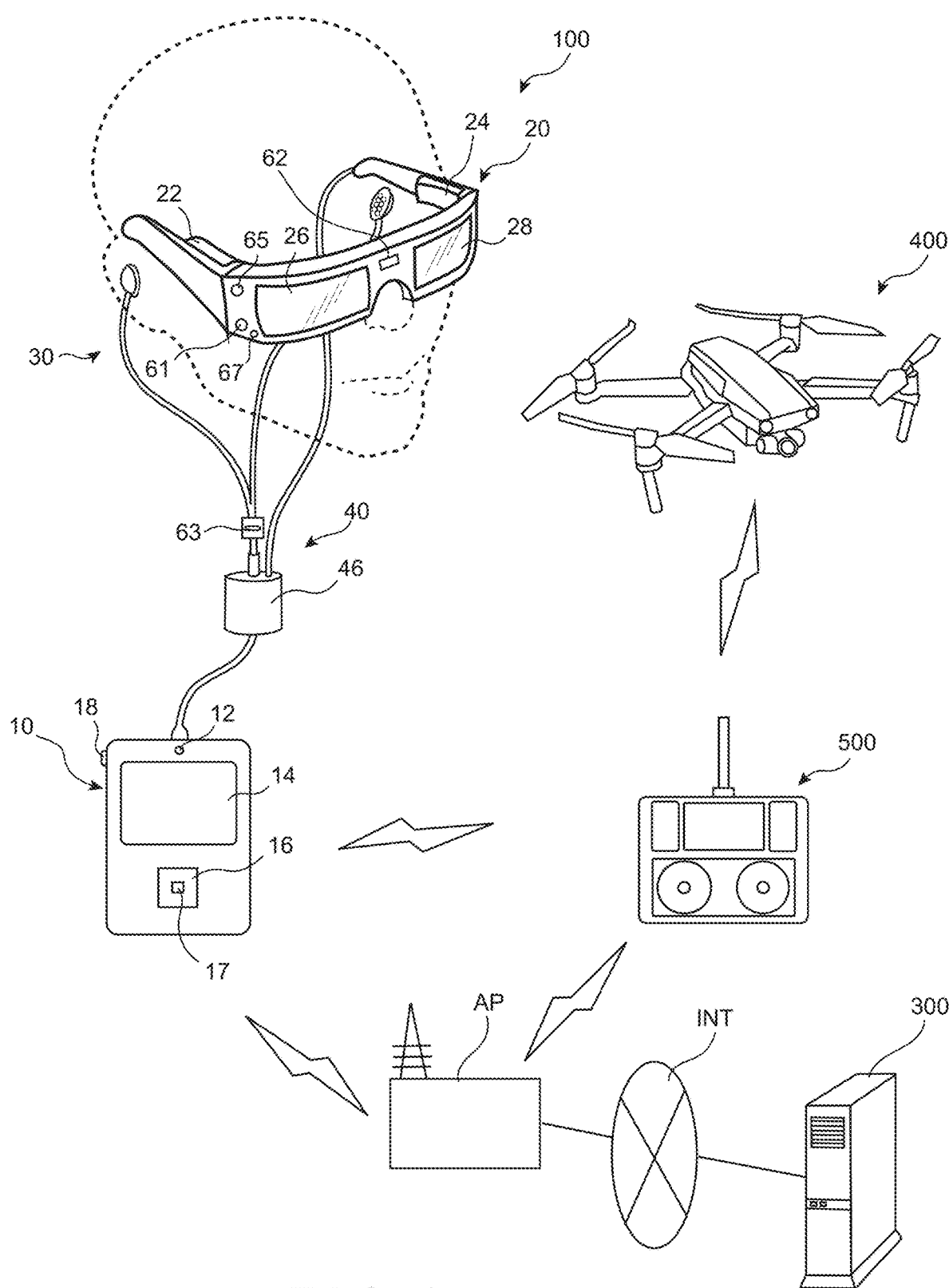
FIG. 15 is a schematic diagram illustrating a target flight path setting system according to a modified example of the embodiment of the present invention.

The target flight path may be stored in a shared server 300 that stores a plurality of flight paths to allow a plurality of users to share the target flight paths. FIG. 15 shows a modified configuration of the system. As shown in FIG. 15, the HMD 100 and the remote control device 500 are connected to the Internet INT via an access point AP connected by wireless communication. As a result, the HMD 100 and the remote control device 500 are connected to each other by a management server 300 and the Internet INT. In this way, the metadata from any unmanned aircrafts can be taken to render new contextually relevant media experiences. Moreover, a local or single user may render past flight paths in the airspace with interactive hotspots by staring at the hotspot in the real world through the HMD 100 to see the media filmed when the unmanned aircraft was at that spot. In a multiuser or social media scenario, multiple users can share past flights via the Internet with other users to see past flight paths, interact with content from other users. The remote control device 500 may be connected to the management server 300 via a LAN rather than the Internet INT.

According to the method, system and computer program for setting the target flight path of the aircraft in the physical environment described above, the pre-programmed flight path can be generated in an intuitive manner while the flight path is visualized and adjusted in the virtual three-dimensional mode AR. More specifically, since the movement of the physical object O is continuously tracked and the continuous path P is simultaneously displayed in the virtual three-dimensional model AR, the user can easily visualize and envision the flight path in the physical environment prior to the flight is actually executed. Visualization of the flight path in the virtual three-dimensional model AR enables the user to recognize obstacles and restrictions, etc. along the intended route right away and so that the user can modify the flight path as necessary prior to the actual flight. Moreover, since the continuous path P is drawn by continuously tracking the movement of the physical object O, complex calculation for connecting two discrete points on the intended flight path can be eliminated. Therefore, the time and processor load required for setting the target flight path can be shortened compared to the system that generates the flight path by connecting discrete locations specified by the user.

MODIFICATION EXAMPLES

Note that the invention is not limited to the embodiment described above. It is possible to carry out the invention in various forms without departing from the spirit of the invention. For example, modifications explained below are possible.

In the above explained embodiment, the HMD 100 is used as an example of the target flight path setting system. However, the virtual three-dimensional model may be provided via a display monitor and the user may interact with the displayed virtual three-dimensional model using a keyboard, a mouse, a joystick, a controller, and any other user input device. Moreover, the virtual three-dimensional model may be provided via an application and/or web interface. The virtual three-dimensional model may be provided via a plugin to an animation and/or modeling software. For example, the virtual three-dimensional model may be loaded into a 3D animation modeling software and a plugin allows a user to interact with the virtual three-dimensional model via the software to set a target flight path of the aircraft.

The method for setting the target flight path explained above may be utilized to plan a coordinated movement of two or more aircrafts. For example, multiple flight paths for multiple aircrafts may be coordinated to perform an air show, an aerial light show, etc.

In the embodiment, the unmanned aircraft (the unmanned aerial vehicle) capable of being remotely piloted or autonomously flying such as a drone is explained as the example of the aircraft. However, the aircraft may be any remotely operated or automatically operated mobile body such as a helicopter, an airplane, a rocket, a hot air balloon, a car, a train, a submarine, a ship, an artificial satellite, a robot, and toys/replicas of those.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method for setting a target flight path of an aircraft in a physical environment, the method comprising:
   displaying a virtual three-dimensional model on an image display section of a head mounted display device, the virtual three-dimensional model being corresponding to the physical environment;
   detecting a physical object in a space corresponding to the virtual three-dimensional model displayed on the image display section by an object detection sensor of the head mounted display device;
   setting a start point in the virtual three-dimensional model according to a user input indicative of a position of the start point;
   tracking a trajectory of the physical object moved in the space corresponding to the virtual three-dimensional model while displaying within the virtual three-dimensional model a continuous path corresponding to the trajectory of the physical object from the start point, the continuous path being displayed on the image display section of the head mounted display device;
   setting an end point of the continuous path in the virtual three-dimensional model according to a user input indicative of a position of the end point;
   generating the target flight path of the aircraft in the physical environment based on the continuous path from the start point to the end point in the virtual three-dimensional model;
   displaying a route marker corresponding to at least a portion of the continuous path as being superimposed on a real-world view of the physical environment;
   switching between a first display mode in which the virtual three-dimensional model is displayed and a second display mode in which the route marker is displayed; and
   saving the target flight path to a shared server that stores a plurality of flight paths to allow a plurality of users to share the target flight paths.

2. The method according to claim 1, wherein the displaying of the continuous path within the virtual three-dimensional model includes reducing noise in data of the trajectory of the physical object to generate display data of the continuous path.

3. The method according to claim 1, wherein the generating of the target flight path includes modifying the continuous path in the virtual three-dimensional model after the setting of the end point.

4. The method according to claim 3, wherein the modifying of the continuous path includes setting a first point and a second point along the continuous path, and deforming a segment of the continuous path between the first point and the second point in the virtual three-dimensional model without moving the first point and the second point by recognizing a movement of the physical object indicative of a deformation of the segment of the continuous path.

5. The method according to claim 1, further comprising displaying in the virtual three-dimensional model a frame indicative of an image capturing area by an image sensor mounted on the aircraft when the aircraft is assumed to be at a position in the physical environment corresponding to a prescribed position in the virtual three-dimensional model.

6. The method according to claim 1, wherein the physical object is a body part of a user.

7. The method according to claim 1, wherein the physical object is a model of the aircraft.

8. The method according to claim 1, wherein the continuously tracking of the trajectory of the physical object includes continuously tracking orientation of the physical object moved in the space corresponding to the virtual three-dimensional model, and the generating of the target flight path of the aircraft includes generating the target flight path including orientation information of the aircraft along the target flight path in the physical environment.

9. The method according to claim 1, further comprising displaying in the virtual three-dimensional model a restricted area corresponding to a restricted flight zone in the physical environment.

10. The method according to claim 9, further comprising issuing a notification when the physical object enters a region corresponding to the restricted area in the virtual three-dimensional model.

11. The method according to claim 9, further comprising displaying in the virtual three-dimensional model an alternate route that avoids the restricted area when the physical object enters a region corresponding to the restricted area in the virtual three-dimensional model.

12. An aircraft control method comprising:
setting the target flight path by the method according to claim 1, and
programming the aircraft to fly according to the target flight path, the aircraft being an unmanned aerial vehicle.

13. A target flight path setting system adapted to set a target flight path of an aircraft in a physical environment, the target flight path setting system comprising:
a head mounted display device including
a display section configured to display a virtual three-dimensional model corresponding to the physical environment;
an object detection sensor configured to detect a movement of a physical object in a space corresponding to the virtual three-dimensional model;
a memory configured to store the movement of the physical object output by the object detection sensor; and a processor configured to
set a start point within the virtual three-dimensional model according to a user input indicative of a position of the start point;
track a trajectory of the movement of the physical object detected by the object detection sensor while controlling the display section to display within the virtual three-dimensional model a continuous path corresponding to the trajectory of the movement of the physical object from the start point, the continuous path being displayed on the display section of the head mounted display device,
set an end point of the continuous path within the virtual three-dimensional model according to a user input indicative of a position of the end point,
generate the target flight path of the aircraft in the physical environment based on the continuous path from the start point to the end point in the virtual three-dimensional model,
display a route marker corresponding to at least a portion of the continuous path as being superimposed on a real-world view of the physical environment;
switch between a first display mode in which the virtual three-dimensional model is displayed and a second display mode in which the route marker is displayed, and
save the target flight path to a shared server that stores a plurality of flight paths to allow a plurality of users to share the target flight paths.

14. A non-transitory machine readable medium storing a program for setting a target flight path of an aircraft in a physical environment to, when executed by one or more processors, cause the one or more processors to perform operations comprising:
displaying a virtual three-dimensional model on an image display section of a head mounted display device, the virtual three-dimensional model corresponding to the physical environment;
setting a start point in the virtual three-dimensional model according to a user input indicative of a position of the start point;
detecting a physical object in a space corresponding to the virtual three-dimensional model displayed on the image display section by an object detection sensor of the head mounted display device;
tracking a trajectory of the physical object moved in the space corresponding to the virtual three-dimensional model while displaying within the virtual three-dimensional model a continuous path corresponding to the trajectory of the physical object from the start point, the continuous path being displayed on the image display section of the head mounted display device;
setting an end point of the continuous path in the virtual three-dimensional model according to a user input indicative of a position of the end point;
generating the target flight path of the aircraft in the physical environment based on the continuous path from the start point to the end point in the virtual three-dimensional model;
displaying a route marker corresponding to at least a portion of the continuous path as being superimposed on a real-world view of the physical environment;
switching between a first display mode in which the virtual three-dimensional model is displayed and a second display mode in which the route marker is displayed; and saving the target flight path to a shared server that stores a plurality of flight paths to allow a plurality of users to share the target flight paths.

15. The method according to claim 6, wherein the body part of the user is the hand of the user.

* * * * *